(12) United States Patent
Suzuki et al.

(10) Patent No.: US 6,775,070 B2
(45) Date of Patent: Aug. 10, 2004

(54) COLLIMATOR LENS

(75) Inventors: Masaru Suzuki, Mohka (JP); Hiroyuki Nagatomo, Tochigi (JP)

(73) Assignee: Hitachi Metals, Ltd., Tokyo (JP)

( * ) Notice: Subject to any disclaimer, the term of this patent is extended or adjusted under 35 U.S.C. 154(b) by 1 day.

(21) Appl. No.: 10/266,623

(22) Filed: Oct. 9, 2002

(65) Prior Publication Data
US 2003/0072533 A1 Apr. 17, 2003

(30) Foreign Application Priority Data
Oct. 12, 2001 (JP) ........................................ 2001-314665

(51) Int. Cl.[7] ............................. G02B 27/30; G02B 6/26
(52) U.S. Cl. ......................................... 359/641; 385/39
(58) Field of Search ............................. 359/641; 385/39

(56) References Cited

U.S. PATENT DOCUMENTS

| | | | | |
|---|---|---|---|---|
| 5,550,678 A | * | 8/1996 | Morby | 359/641 |
| 5,592,333 A | * | 1/1997 | Lewis | 359/628 |
| 6,195,208 B1 | * | 2/2001 | Ngoi et al. | 359/641 |
| 6,377,403 B1 | * | 4/2002 | Smith | 359/667 |
| 6,469,835 B1 | * | 10/2002 | Liu | 359/641 |
| 2002/0150377 A1 | * | 10/2002 | Gelbart | 385/140 |
| 2003/0026002 A1 | * | 2/2003 | Lopez-Hernandez et al. | 359/641 |

* cited by examiner

*Primary Examiner*—Ricky Mack
(74) *Attorney, Agent, or Firm*—Sughrue Mion, PLLC

(57) ABSTRACT

A collimator lens which makes it possible to limit the direction in which the optical axis of the light discharged from the collimator lens deviates to a specific direction and to accomplish alignment easily is to be provided. The collimator lens comprises a cylindrical glass tube, a columnar fiber chip which is fixed within the cylindrical glass tube and has a through-hole along its center axis, and one end of which is an elliptic surface tilted at a predetermined angle to the center axis, an optical fiber which is inserted from the other end of the fiber chip into its through-hole and whose tip is positioned on the elliptic surface, and a columnar lens which has at one end an elliptic surface opposite the elliptic surface of the fiber chip substantially in parallel and is fixed in the cylindrical glass tube, and has a reference plane parallel to a plane containing the major axis of the elliptic surface at one end of the columnar fiber chip and the center axis of the columnar lens, the reference plane serving as a reference when the collimator lens is to be aligned.

8 Claims, 4 Drawing Sheets

COLLIMATOR LENS

BACKGROUND OF THE INVENTION

1. Field of the Invention

The present invention relates to a collimator lens mainly used for connecting optical paths or the like in the field of optical communication.

2. Description of the Related Art

Technological innovation in the fields of information and communication today is remarkable indeed and, to meet the requirements for higher communication speed and a dramatically increased capacity for the transmission of information in connection with the extensive use of the Internet, optical signals are replacing electric signals as the principal medium of communication. A majority of backbone cables have been replaced by optical cables, but optical cables are not yet extensively developed for connection between backbone cables and individual users, resulting in an unsatisfactory level of overall communication speed. For this reason, further heightening hope is pinned on thorough coverage by optical information and communication networks.

In establishing an optical communication network, many problems which are not experienced with electric signals arise in the connection and branching of the optical path. Where electric signals are to be transmitted, even if the direction of the circuit formed of a conductor varies complexly, the electric signals are propagated with little attenuation, if any. However, if there is an abrupt directional change of the optical path or misalignment, optical signals will leak out of the optical path and their intensity will significantly attenuate.

For optical path connection, an optical fiber is connected to another, and for changing the direction of the optical path, optical signals emitted from an end of an optical fiber are reflected with a mirror to change their optical path, received by an end of another optical fiber, and propagated by that optical fiber. In any case, a light is discharged from an end of an optical fiber, and the discharged light is received by an end of another optical fiber. The light discharged from the end of the sending optical fiber is expanded and, if received by the end of the other optical fiber, it can be only partially received, resulting in a substantial attenuation of optical signals.

Since an end of an optical fiber is small, only about 10 $\mu$m in diameter, it is difficult to position the outlet end of an optical fiber exactly opposite an end of another optical fiber. As a consequence, there is a great loss of optical signals in the connecting part between optical fibers.

Collimator lenses are fitted to ends of optical fibers to connect the optical fibers on the discharging side and the receiving side to increase the diameter of the light emitted from the end of an optical fiber, make the light beam parallel between the collimator lenses and focus the parallel light beam on the end of the receiving optical fiber. By fitting collimator lenses to the ends of optical fibers, the diameter of the light beam can be increased to a few hundred $\mu$m, and the alignment of the optical path can be made relatively easy. When collimator lenses are to be fitted to the ends of optical fibers, if their connecting end faces are oriented normal to the optical axis, the reflection loss on the end faces will be great. Especially if the end of the optical fiber guiding optical signals from a laser beam source or the like is normal to the optical axis, the light reflected by that end face is returned to the light source and may give rise to resonance at the source.

In an attempt to solve this problem, the end of the optical fiber is inclined by about 8° relative to a plane normal to the optical axis, and the reflection from the end face is thereby prevented. The opposite surface of the collimator lens facing the end of the optical fiber is also inclined at substantially the same angle. If the end face of the optical fiber is inclined and the lens face opposite it is inclined by the same angle, these faces will become parallel to each other. If the optical fiber and the lens are equal in refractive index, the optical axis of the optical fiber and the optical axis of the lens will be in substantially the same direction even though there may be a slight discrepancy. However, since there is a slight difference in angle between the end face of the optical fiber and the end face of the lens and there also is a slight difference between them in refractive index, usually the optical axis of the light coming out of the collimator lens is at some angles relative to the optical axis of the optical fiber. Since the angle of the end face of the optical fiber, that of the end face of the lens and the distance between those end faces differ from collimator to collimator, the angle of the optical axis of the light coming out of the collimator lens also differs from collimator to collimator.

When a light emitted from one optical fiber is to be received by another optical fiber by connecting the optical fibers or by changing the direction of the light emitted from the first optical fiber by having it reflected by a mirror, alignment or adjustment between the two optical fibers is needed to bring the optical axes of the collimator lenses into concurrence. As the freedom of a collimator lens exists on six axes (the three axes of x, y and z for aligning the tip positions, the rotational freedom around the x axis, that around the y axis and that around the z axis), this alignment is nothing easy. Furthermore, even though the optical axes of the lenses are aligned, if the optical axes of the optical fibers are not on the same plane, the aligned plurality of collimators will extend three-dimensionally.

SUMMARY OF THE INVENTION

Therefore, an object of the present invention is to provide a collimator lens which makes it possible to limit the direction in which the optical axis deviates within a specific plane and to accomplish alignment easily.

A collimator lens according to the invention comprises:

a cylindrical glass tube, a columnar fiber chip which is fixed within the cylindrical glass tube and has a through-hole along its center axis, and one end of which is an elliptic surface tilted at a predetermined angle to the center axis, an optical fiber which is inserted from the other end of the fiber chip into its through-hole and whose tip is positioned on the elliptic surface, and a columnar lens which has at one end an elliptic surface opposite the elliptic surface of the fiber chip substantially in parallel and is fixed in the cylindrical glass tube, wherein the collimator lens has a reference plane parallel to a plane containing a major axis of the elliptic surface at one end of the columnar fiber chip and a center axis of the columnar lens, the reference plane serving as a reference when the collimator lens is to be aligned.

Preferably, the collimator lens should have a surface or side surface formed by cutting off part of the collimator lens along the reference plane. Preferably the surface or side surface should be formed away from the center axis of the columnar lens by 60% or more of the radius r of the columnar lens. Even more preferably the surface or side surface should be formed away from the center axis of the columnar lens by 60% or more of but less than the radius of the columnar lens.

The collimator lens according to the invention can further have a base plate, onto the upper surface of which is fitted the collimator lens, aligned with the surface or side surface.

The collimator lens can have at least one hole formed from the outer circumference of the glass tube toward the columnar lens center axis along a perpendicular from one point on the columnar lens center axis down to the reference plane. Preferably, the depth of the hole or holes from the outer circumference of the columnar lens should be less than 40% of the radius of the columnar lens.

The collimator lens according to the invention can further have a base plate, wherein the collimator lens is fitted by coupling the hole to a stud provided vertically on the top surface of the base plate.

A collimator lens may be manufactured according to the present invention by the following process:

a cylindrical glass tube, a columnar fiber chip having a through-hole along its center axis and a columnar lens are partially cut off by a plane parallel to the center axis to form side surfaces on the sides of the cylindrical glass tube, the columnar fiber chip and the columnar lens, an optical fiber is inserted into the through-hole along the center axis of the columnar fiber chip from one of the ends of the through-hole, elliptic surfaces having angles of 3 to 10° to the respective center axes of the columnar fiber chip and the columnar lens and being normal to the side surfaces formed on the sides respectively are formed by grinding the other end of the columnar fiber chip and one end of the columnar lens, the columnar fiber chip and the columnar lens are assembled into the cylindrical glass tube, so that the elliptic surface of the columnar fiber chip and that of the columnar lens are positioned opposite each other, and the side surface of the cylindrical glass tube, the side surface of the columnar fiber chip and the side surface of the columnar lens are brought together to form on the side a surface serving as a reference plane parallel to a plane containing a major axis of the elliptic surface at the other end of the columnar fiber chip and a center axis of the columnar lens.

Another method for manufacturing a collimator lens according to the present invention is:

a cylindrical glass tube is provided with a hole formed from an outer surface of the glass tube toward a center axis of the glass tube on a side wall of the glass tube, a columnar lens with a hole, from an outer surface of the lens toward a center axis of the lens, the depth of which is less than 40% of a radius of the lens and a columnar fiber chip with an optical fiber inserted into a through-hole along the center axis of the fiber chip from one end of the fiber chip, elliptic surfaces having angles of 3 to 10° to the respective center axes of the columnar fiber chip and the columnar lens are formed by grinding the other end of the columnar fiber chip and one end of the columnar lens, the elliptic surface formed at the one end of the columnar lens being parallel to the hole of the columnar lens, the columnar fiber chip and the columnar lens are assembled into the cylindrical glass tube, so that the elliptic surface of the columnar fiber chip and that of the columnar lens are positioned opposite each other, and the hole of the cylindrical glass tube and the hole of the columnar lens are brought together to fix the columnar fiber chip and the columnar lens within the cylindrical glass tube to form on the side wall a reference hole normal to a plane containing a major axis of the elliptic surface at the other end of the columnar fiber chip and a center axis of the columnar lens.

DETAILED DESCRIPTION OF THE PREFERRED EMBODIMENTS

Collimator lenses according to the present invention as embodied in EXAMPLES thereof will be described below with reference to FIGS. 1 through 9.

EXAMPLE 1

Figure 1:
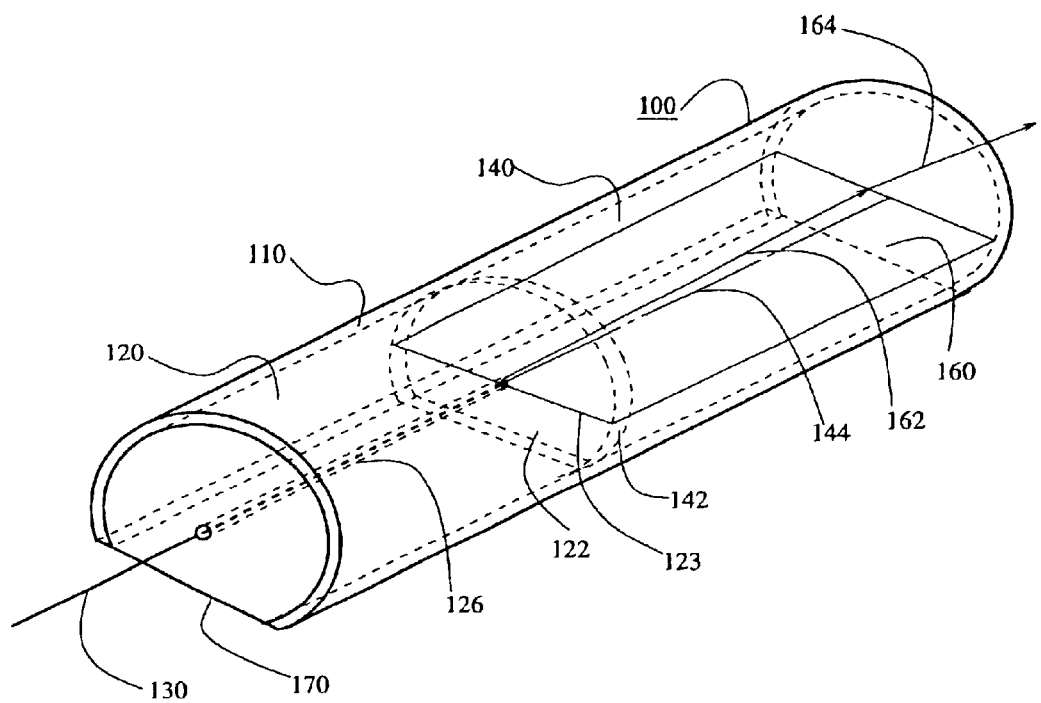
FIG. 1 shows a perspective view of a collimator lens, which is EXAMPLE 1 of the present invention.
Figure 2:
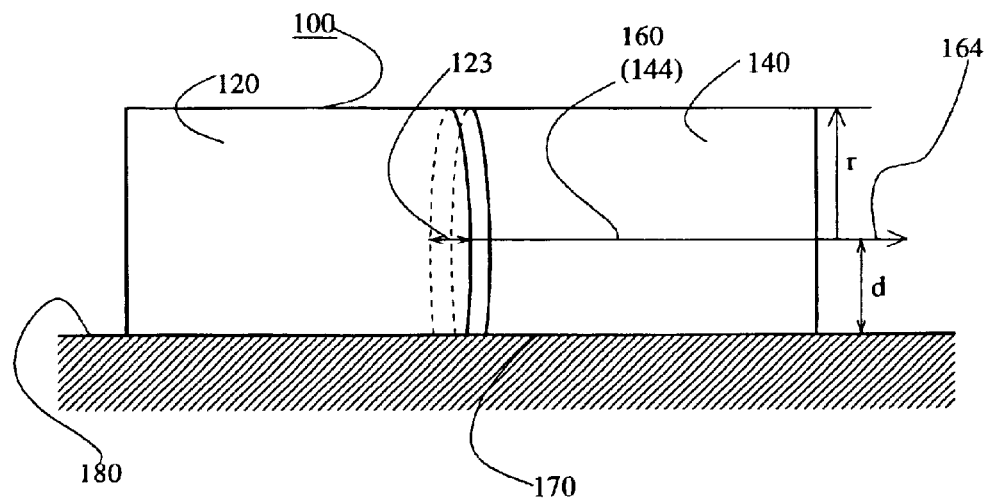
FIG. 2 shows a side view of the collimator lens of EXAMPLE 1 mounted on a base plate, with the glass tube omitted.
Figure 3:
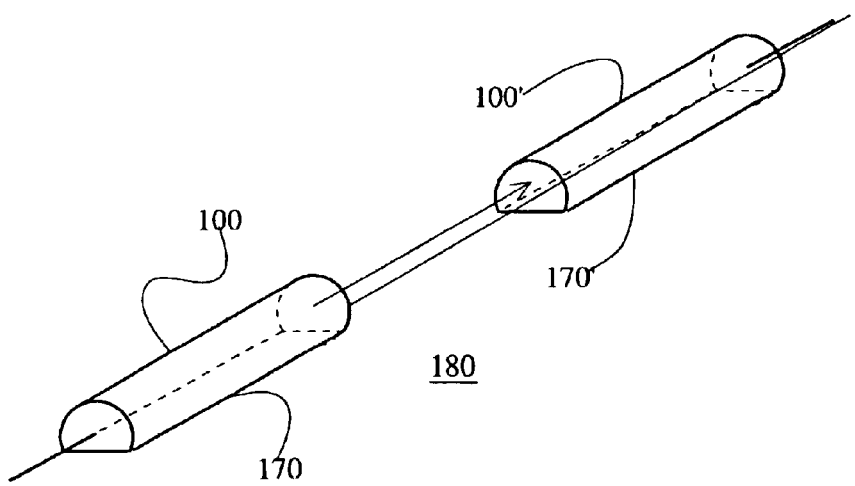
FIG. 3 is a schematic diagram for describing the alignment of two collimator lenses of EXAMPLE 1 positioned opposite each other.

A collimator lens which is EXAMPLE 1 of the invention is illustrated in FIGS. 1 through 4. FIG. 1 shows a perspective view of the collimator lens of EXAMPLE 1; FIG. 2, a side view of the collimator lens of EXAMPLE 1, with the glass tube omitted; FIG. 3 is a schematic diagram for illustrating the alignment of two collimator lenses of EXAMPLE 1 positioned opposite each other; and FIG. 4, a schematic diagram for describing the alignment of two collimator lenses of EXAMPLE 1 with a mirror between them.

In a collimator lens 100 of FIG. 1, a columnar fiber chip 120 and a columnar lens 140 are arranged in a cylindrical glass tube 110 with elliptic surfaces 122 and 142, provided at one end of them, respectively, positioned opposite each other. The diameter of the columnar fiber chip 120 and the columnar lens 140 may be, for instance, 1 mm; that of the cylindrical glass tube 110, for instance, 1.8 mm; and the overall length of the collimator lens 100, for instance, 10 mm. The columnar fiber chip 120 has a through-hole 126 bored along its center axis. An optical fiber 130 is inserted into the through-hole 126, the tip of the optical fiber 130 reaching the elliptic surface 122 provided at one end of the columnar fiber chip 120. That end of the columnar fiber chip 120 and the tip of the optical fiber 130 are ground integrally, and the elliptic surface 122 is formed at an angle of 3 to 10° to the center axis of the fiber chip (which is concurrent with the optical axis of the optical fiber 130). (Since the angle of a plane is represented by the direction of a perpendicular outward from the plane, that "the elliptic surface 122 is formed at an angle of 3 to 10° to the center axis" means that "a perpendicular from the elliptic surface 122 has an angle of 3 to 10° to the center axis." All similar expressions in the rest of this specification shall be construed in the same way, unless otherwise specified.) At the above-mentioned one end of the columnar lens 140, the elliptic surface 142 is also formed at an angle of 3 to 10° to the center axis of the columnar lens 140. The angles of the elliptic surfaces 122 and 142 should preferably be about 8° to the respective center axes.

The columnar lens 140 is arranged side by side with the columnar fiber chip 120 within the cylindrical glass tube 110 so that those elliptic surfaces 122 and 142 be parallel to and opposite each other. Optical signals guided within the optical fiber 130 are refracted by its end face to be discharged into the gap between the elliptic surfaces 122 and 142, refracted again by the elliptic surface 142 of the lens 140 and parallelized by the lens 140. If the tip face of the optical fiber 130 (the same face as the elliptic surface 122) and the elliptic surface 142 of the lens 140 are exactly parallel to each other and the refractive index of the optical fiber 130 and that of the lens 140 are exactly the same, the optical axis of the optical fiber 130 and the optical axis of the parallel light beam within the lens 140 will be parallel to each other, and if the gap between the elliptic surfaces is extremely narrow, the optical axis of the optical fiber 130 and that of the parallel light beam within the lens 140 will be concurrent with each other, but these optical axes usually are not. However, it is easy to align the fiber chip 120 and the lens 140 in assembling them so that the major (longer) axes of the elliptic surface 122 of the fiber chip 120 and of the elliptic surface 142 of the lens 140 be oriented in the same direction. By arranging the fiber chip 120 and the lens 140 side by side within the glass tube 110 when assembling so that the major axes of these surfaces be oriented in the same direction, the optical axis of the optical fiber 130 and the optical axis of the parallel light beam in the lens 140 can be confined within the same plane, i.e. a plane 160 containing the major axis 123 of the elliptic surface 122 and the center axis 144 of the lens 140. A light 162 within the plane containing the major axis 123 of the elliptic surface 122 and the center axis 144 of the lens 140 is also refracted when it is discharged from the right side end (in FIG. 1) of the lens 140, but the axis 164 of the discharged light is also within the same plane.

The collimator lens 100 according to the invention has a reference plane 170 parallel to the plane 160 containing the major axis 123 of the elliptic surface 122 at one end of the columnar fiber chip 120 and the center axis 144 of the columnar lens 140, and a side surface is formed by cutting off part of the collimator lens along the reference plane. In this embodiment of the invention, the reference plane 170 is the same as the side surface.

As illustrated in FIG. 2, which is a side view of the collimator lens 100 mounted on a base plate 180, with the glass tube omitted, the distance from the center axis of the collimator lens to the side surface 170 formed by cutting off part of the collimator lens 100 is represented by d. The optical axis 164 of the light discharged externally from the tip face of the optical fiber 130 via the columnar lens 140 is confined within the plane 160 containing the major axis 123 of the elliptic surface 122 of the columnar fiber chip 120 and the center axis 144 of the columnar lens 140. The plane 160 is at a distance d from the side surface 170.

The distance d from the center axis 144 of the columnar lens 140 to the side surface 170 should preferably be at least 60% of the radius r of the columnar lens 140. If the side surface 170 is at a distance less than 60% of the radius r, the parallel light beam passing within the columnar lens 140 will decrease and invite greater attenuation of the optical signals. Conversely, in order to provide the columnar lens 140 with a side surface, the distance d between the side surface 170 and the center axis is required to be less than the radius r. For a preferred embodiment of the invention, 0.4 mm is selected as the value of d.

Alignment of the collimator lens 100 described above and a collimator lens 100' having the same structure as the collimator lens 100 opposite each other to connect them is illustrated in a schematic diagram of FIG. 3. Referring to FIG. 3, the collimator lenses 100 and 100' are arranged over the base plate 180 (whose surface is horizontal) with their side surfaces 170 and 170' aligned with each other. Since the respective axes of the collimator lenses 100 and 100' are in a plane at the distance d from the base plate 180, the optical axes of the collimator lenses 100 and 101' can be aligned by adjusting the collimator lens 100' over the base plate 180. Thus, since the plane in which the optical axis is present is specified in the collimator lens according to the invention, alignment can be done within that plane, and the freedom is allowed on three axes, resulting in facilitated alignment.

Figure 4:
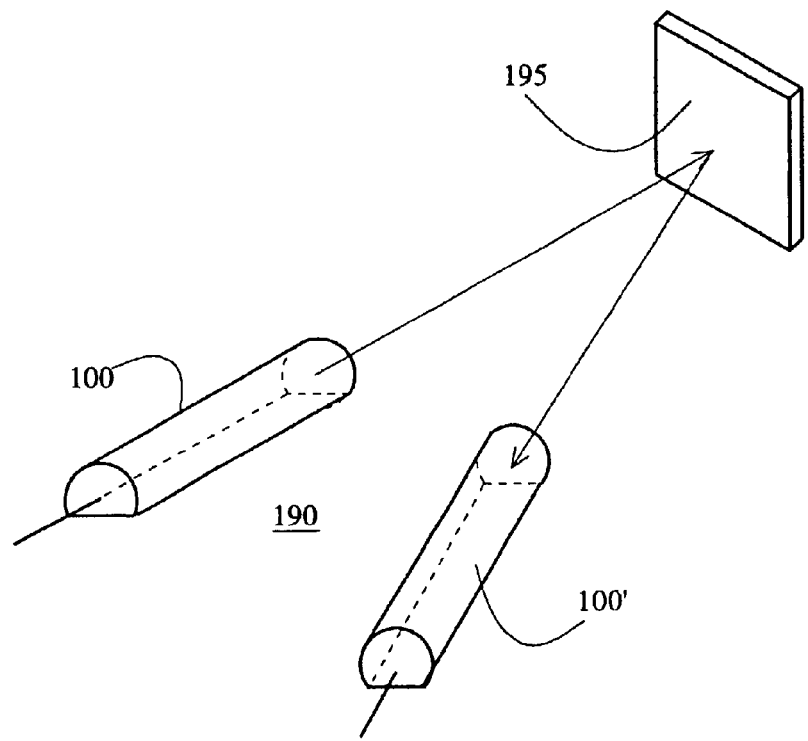
FIG. 4 is a schematic diagram for describing the alignment of two collimator lenses of EXAMPLE 1 with a mirror between them.

An example in which the collimator lenses 100 and 100' are arranged with a mirror between them and aligned to be opposite each other is shown in a schematic diagram of FIG. 4. The collimator lenses 100 and 100' and a mirror 195 are arranged over a base plate 190. The mirror 195 stands vertically on the upper surface of the base plate 190. The emitted light from the collimator lens 100, as is evident from the foregoing description, is confined within a plane which is at the distance d from the base plate 190. Since the mirror 195 stands vertically on the base plate 190, the reflected light is also confined within a plane which is at the distance d from the base plate 190. Then, it might be readily understood that, in order to align the optical axis of the collimator lens 100' with the optical axis of the reflected light from the mirror 195, the position and direction of the collimator lens 100' can be adjusted on the base plate 190.

To produce the collimator lens 100, a side surface is formed by grinding or otherwise on each of the cylindrical glass tube 110, the columnar fiber chip 120 having the through-hole 126 bored along the center axis, the columnar lens 140 along a plane parallel to and at suitable distances from their respective center axes. In order for the side surface formed on the cylindrical glass tube 110, that formed on the columnar fiber chip 120 and that formed on the columnar lens 140 to constitute a single side surface 170 or plane when they are later assembled, the columnar fiber chip 120 and the columnar lens 140 can be inserted into the cylindrical glass tube 110 and assembled in advance, and the side surface 170 can be formed by grinding or otherwise in a state in which they are integrated. The distance d from the center axis to the side surface 170 so formed should preferably be 60% or more of the radius r of the lens 140 as explained above. On the other hand, in order to prevent the lens 140 from turning round its center axis, a state in which the lens 140 is slightly shaved is desirable, and it should preferably be less than the radius.

After the optical fiber 130 is inserted into the through-hole 126 along the center axis of the columnar fiber chip 120 and fixed (by, for instance, using an adhesive or the like), one end of the columnar fiber chip 120 positioned toward the tip of the optical fiber 130 is ground with reference to the side surface formed as described above in a direction normal to that side surface and at an angle of 3 to 10° to the center axis, and the elliptic surface 122 is thereby formed at that end. Also, one end of the columnar lens 140 is ground to form at that end the elliptic surface 142 in a direction normal to the side surface formed as described above and at an angle of 3 to 10° to the center axis.

The major axis of the elliptic surface 122 formed on the columnar fiber chip 120 and the center axis of the fiber chip 120 are parallel to the side surface formed in advance on the fiber chip 120, and the major axis of the elliptic surface 142 formed on the columnar lens 140 and the center axis of the lens 140 are parallel to the side surface formed in advance on the lens 140. When the elliptic surface 122 of the columnar fiber chip 120 and the elliptic surface 142 of the columnar lens 140 are arranged opposite each other within the cylindrical glass tube 110 and the fiber chip 120 and the lens 140 are inserted, the major axes of the elliptic surface 122 and the elliptic surface 142 are aligned. By fixing the fiber chip 120 and the lens 140 within the glass tube 110 with an adhesive, the collimator lens 100 is assembled. The side surface formed on each of these components is parallel to the plane containing the major axis 123 of the elliptic surface 122 and the center axis 144 of the lens 140, and the side surfaces which the components have constitute a reference plane on the side of the collimator lens 100 when the collimator lens 100 is assembled.

EXAMPLE 2

Figure 5:
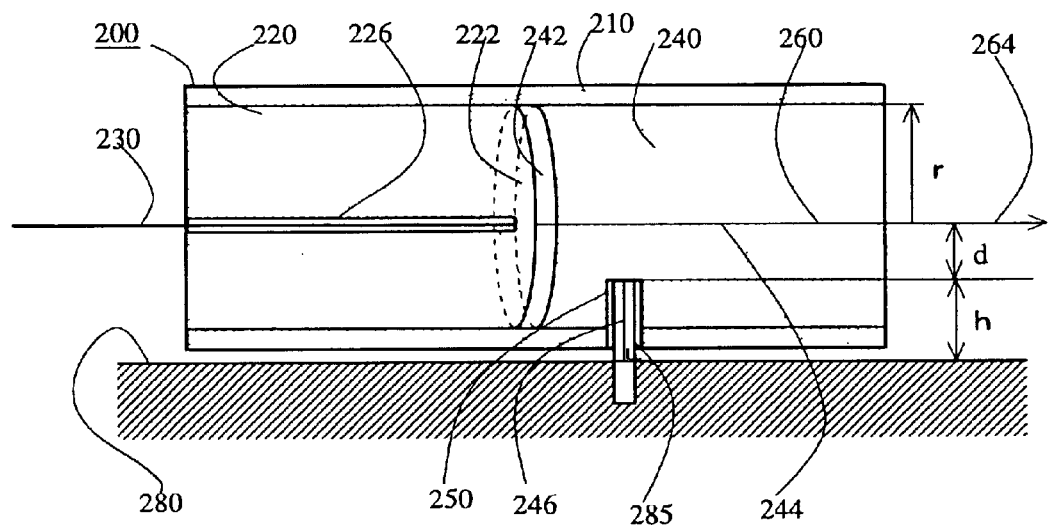
FIG. 5 shows a longitudinal section of the collimator lens of EXAMPLE 2 mounted on a reference plane (base plate)

FIG. 5 shows a collimator lens 200, which is EXAMPLE 2 of the present invention. The collimator lens 200 is provided within a cylindrical glass tube 210 with a columnar fiber chip 220 and a columnar lens 240 with elliptic surfaces 222 and 242 at one end each of the chip and the lens, respectively, arranged opposite each other. The columnar fiber chip 220 has a through-hole 226 bored along its center axis, an optical fiber 230 is inserted into the through-hole 226, so that one end of the optical fiber 230 reach the elliptic surface 222 at one end of the columnar fiber chip 220. That end of the columnar fiber chip 220 and the tip of the optical fiber 230 are integrally ground, and the elliptic surface 222 is formed at an angle of 3 to 10° to the center axis of the fiber chip (concurrent with the optical axis of the optical fiber 230). At one end of the columnar lens 240, too, the elliptic surface 242 is formed at an angle of 3 to 10° to the center axis of the columnar lens 240. Preferable angles of the elliptic surfaces 222 and 242 are about 8° to the center axis.

As is evident from the description of the collimator lens 100 of EXAMPLE 1, in the collimator lens 200 of EXAMPLE 2 as well, the major (longer) axes of the elliptic surface 222 and the elliptic surface 242 are aligned in parallel in the same direction, and therefore the axis 264 of the light ray emitted from the tip of the optical fiber 230 and parallelized by the lens 240 is confined to a plane 260 containing the major axis of the elliptic surface 222 and the center axis 244 of the lens 240.

A plane 280 parallel to the plane 260 containing the major axis of the elliptic surface 222 and the center axis of the lens 240 is used as a reference plane for the collimator lens 200 of EXAMPLE 2. In the collimator lens 200, a columnar hole 250 along a perpendicular 246 from the center axis 244 of the columnar lens 240 to the reference plane 280 is formed from the outer circumference of the cylindrical glass tube 210 of the collimator lens 200 toward the center axis 244 of the columnar lens 240. This hole 250, which is normal to the reference plane, can be referred to as a reference hole. The distance d from the center axis 244 to the bottom of the hole 250 is 60% or more of the radius r of the columnar lens 240, i.e. its depth from the outer circumference of the columnar lens 240 is less than 40% of the radius r. If the dimensions of the collimator lens 200 are the same as those of the collimator lens 100 of EXAMPLE 1, the diameter of the cylindrical glass tube 210 is 1.8 mm and that of the columnar lens 240, 1.0 mm. The bore of the hole 250, if its depth from the outer circumference of the cylindrical glass tube is, for instance, 0.55 mm, will be, for instance, 0.4 mm. As the depth of the hole 250 from the outer circumference of the columnar lens 240 then is 0.15 mm, its ratio to the radius r (0.5 mm) is 30%.

Although the hole 250 is described here with reference to a columnar hole by way of example, its shape may as well be a cone, a circular truncated cone or a polygonal prism. A columnar pin (stud) 285 stands in an appropriate position on the reference plane 280, and the columnar pin 285 is inserted into the hole 250 to fit the collimator lens 200 onto the reference plane 280. The height h of the columnar pin 285 from the reference plane 280 should be greater than the depth of the hole 250 from the outer circumference of the collimator lens 200.

Since the collimator lens 200 can be rotated round the pin 285 while keeping the distance from the reference plane 280 to the plane 260 constant, it is possible to keep the optical axis of the collimator lens 200 at a fixed distance from the reference plane 280.

Alignment of the collimator lenses 100 and 100' on the plane 180 in EXAMPLE 1 was explained with reference to FIG. 3. In a similar way, two collimator lenses 200 can be aligned on the reference plane 280. By providing two long pins (studs) of equal lengths at a predetermined difference on the reference plane 280 and fitting one or the other of the collimator lenses 200 to each pin, the optical axes of those collimator lenses 200 are kept within a plane at the same distance from the reference plane 280. Then, by turning the collimator lenses around the pins or holes, those collimators can be aligned with each other.

Figure 6:
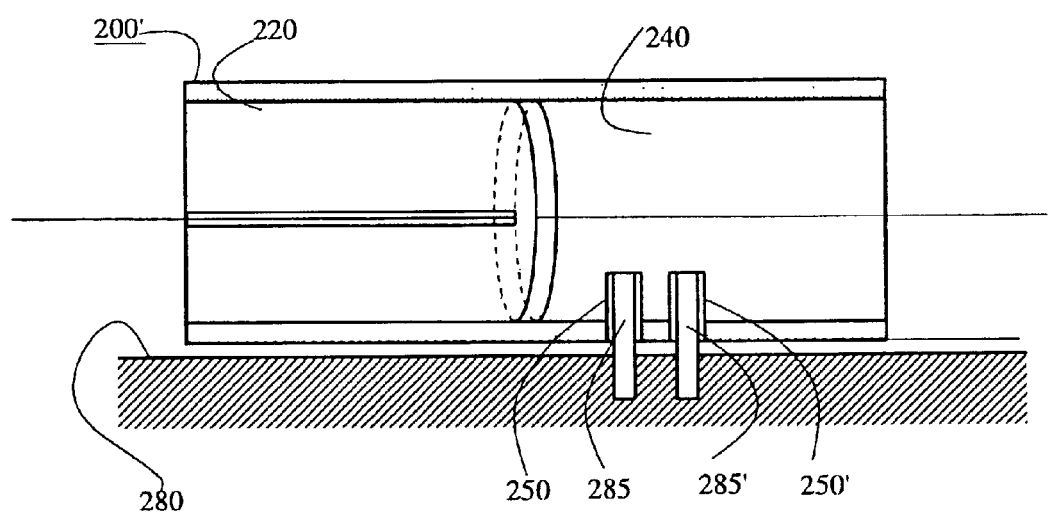
FIG. 6 shows a longitudinal section of a collimator lens, which is a modification of the collimator lens of EXAMPLE 2, mounted on a reference plane (base plate)

FIG. 6 shows a collimator lens 200', which is a modification of the collimator lens 200 of EXAMPLE 2. For the collimator lens 200' in FIG. 6, the same components and parts as their respective counterparts in the collimator lens 200 are denoted by the same reference numerals. In the collimator lens 200', a similar hole 250' is bored in the lens 240 in parallel to the hole 250, and the two holes respectively engage with pins (studs) 285 and 285' standing normal to the reference plane 280. If a straight line linking the hole 250 and the hole 250' is caused to be concurrent with the direction of the optical axis of the collimator lens 200', alignment with the other collimator lens will be facilitated.

Figure 7:
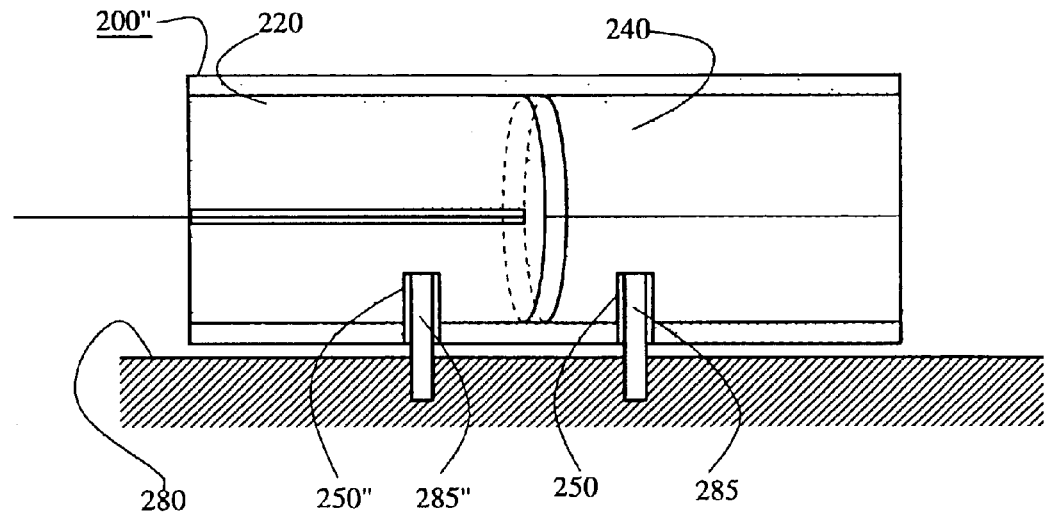
FIG. 7 shows a longitudinal section of a collimator lens, which is another modification of the collimator lens of EXAMPLE 2, mounted on a reference plane (base plate)

FIG. 7 shows a longitudinal section of a collimator lens 200", which is another modification of the collimator lens 200 of EXAMPLE 2. For the collimator lens 200" in FIG. 7, the same components and parts as their respective counterparts in the collimator lens 200 are denoted by the same reference numerals. In the collimator lens 200", a similar hole 250" is bored in the columnar fiber chip 220 in parallel to the hole 250, and the two holes respectively engage with pins (studs) 285 and 285" standing normal to the reference plane 280. By turning the fiber chip 220 round the hole 250"

and the collimator lens 240 around the hole 250 by appropriate angles, the direction of the optical axis of the collimator lens 200" can be adjusted.

EXAMPLE 3

Figure 8:
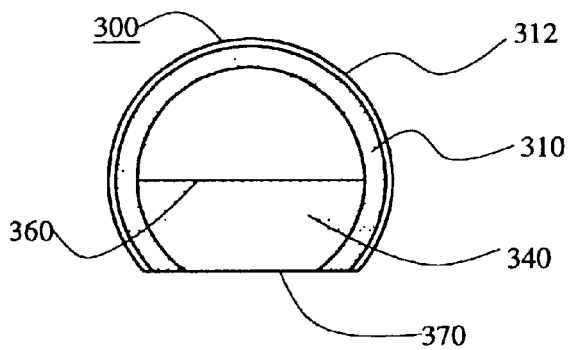
FIG. 8 shows a section, normal to the center axis of the columnar lens, of a collimator lens which is EXAMPLE 3 of the invention.

FIG. 8 shows a section, normal to the center axis of a columnar lens 340, of a collimator lens 300 which is EXAMPLE 3 of the present invention. This collimator lens 300 has substantially the same structure as the collimator lens 100 of EXAMPLE 1, the major difference being outer coating 312 consisting of an arc-shaped metal tube of about 0.15 mm in thickness and provided around the outer circumference of a cylindrical glass tube 310. The collimator lens 300 is cut off along a reference plane parallel to a plane 360 containing the major axis of the elliptic surface of a columnar fiber chip (not shown) and the center axis of the columnar lens 340 to form a side surface 370. Since the metal tube outer coating 312 is not formed on the side surface 370, the side surface 370 is directly mounted on an adjusting base plate, and alignment can be accomplished by adjusting the positions and angles of the two collimator lenses on the base plate.

EXAMPLE 4

Figure 9:
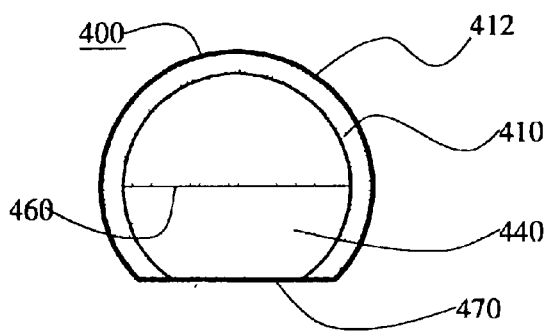
FIG. 9 shows a section, normal to the center axis of the columnar lens, of a collimator lens which is EXAMPLE 4 of the invention.

FIG. 9 shows a section, normal to the center axis of a columnar lens 440, of a collimator lens 400 which is EXAMPLE 4 of the invention. The collimator lens 400 has substantially the same structure as the collimator lens 100 of EXAMPLE 1, the major difference being a plated film 412 of about 3 µm in thickness formed on the outer circumference of a cylindrical glass tube 410. The collimator lens 400 is cut off along a reference plane parallel to a plane 460 containing the major axis of the elliptic surface of a columnar fiber chip (not shown) and the center axis of the columnar lens 440 to form a side surface 470. The plated film 412 of about 3 µm in thickness is also formed on this side surface, so that the side surface 470 can be used as the reference plane for alignment.

What is claimed is:

1. A collimator lens comprising:
   a cylindrical glass tube;
   a columnar fiber chip which is fixed within the cylindrical glass tube and has a through-hole along its center axis, and one end of which is an elliptic surface tilted at a predetermined angle to the center axis,
   an optical fiber which is inserted from the other end of the fiber chip into the through-hole, a tip of the optical fiber being positioned on the elliptic surface; and
   a columnar lens which has at one end an elliptic surface opposite to and substantially in parallel with the elliptic surface of the fiber chip and is fixed in the cylindrical glass tube,
   wherein the collimator lens has a reference plane parallel to a plane containing a major axis of the elliptic surface at one end of the columnar fiber chip and a center axis of the columnar lens, the reference plane serving as a reference when the collimator lens is to be aligned.

2. A collimator lens as set forth in claim 1, having a surface formed by cutting off part of the collimator lens along the reference plane.

3. A collimator lens as set forth in claim 2, wherein the surface formed by cutting off part of the collimator lens along the reference plane is formed away from the center axis of the columnar lens by 60% or more of the radius of the columnar lens.

4. A collimator lens as set forth in claim 3, wherein the surface formed by cutting off part of the collimator lens along the reference plane is formed away from the center axis of the columnar lens by 60% or more of but less than the radius of the columnar lens.

5. A collimator lens as set forth in claim 2, further having a base plate, onto the upper face of which is fitted the collimator lens, aligned with the surface formed by cutting off part of the collimator lens along the reference plane .

6. A collimator lens as set forth in claim 1, having a hole formed from the outer circumference of the glass tube toward the columnar lens center axis along a perpendicular from one point on the columnar lens center axis down to the reference plane.

7. A collimator lens as set forth in claim 6, wherein a depth of the hole from the outer circumference of the columnar lens is less than 40% of the radius of the columnar lens.

8. A collimator lens as set forth in claim 6, further having a base plate, wherein the collimator lens is fitted by coupling the hole to a stud provided vertically on the top surface of the base plate.

* * * * *